United States Patent [19]

Shibata et al.

[11] Patent Number: 5,658,504
[45] Date of Patent: Aug. 19, 1997

[54] METHOD OF PRODUCING AN INFRARED TRANSMITTING BARIUM FLUORIDE SINTERED BODY

[75] Inventors: Kenichiro Shibata; Akihito Fujii; Toshihiro Sakamoto, all of Hyogo, Japan

[73] Assignee: Sumitomo Electric Industries, Ltd., Osaka, Japan

[21] Appl. No.: 443,894

[22] Filed: May 17, 1995

Related U.S. Application Data

[60] Division of Ser. No. 389,420, Feb. 16, 1995, Pat. No. 5,502,015, which is a continuation-in-part of Ser. No. 84,616, Jul. 1, 1993, abandoned.

[30] Foreign Application Priority Data

Jul. 1, 1992 [JP] Japan ..................... 4-197835

[51] Int. Cl.⁶ .......................................... B29D 11/00
[52] U.S. Cl. .............................. 264/1.23; 264/666
[58] Field of Search .................. 264/1.23, 57, 65, 264/66

[56] References Cited

U.S. PATENT DOCUMENTS

| | | | |
|---|---|---|---|
| 3,312,759 | 4/1967 | Letter | 501/151 X |
| 3,359,066 | 12/1967 | Hatch et al. | 501/151 X |
| 3,431,326 | 3/1969 | Letter | 264/1 |
| 3,476,690 | 11/1969 | Carnall, Jr. | 252/584 |
| 3,981,818 | 9/1976 | Swinehart et al. | 252/300 |
| 4,038,201 | 7/1977 | Hargreaves | 252/300 |
| 4,146,379 | 3/1979 | Copley et al. | 65/18 |
| 4,217,318 | 8/1980 | Anderson | 264/1.23 |
| 4,582,681 | 4/1986 | Asari et al. | 419/49 |

FOREIGN PATENT DOCUMENTS

| | | |
|---|---|---|
| 1467263 | 6/1969 | Germany. |
| 3-23251 | 1/1981 | Japan. |
| 58-110466 | 7/1983 | Japan. |

OTHER PUBLICATIONS

Austin, A. E.; Mueller, J. J.; Miller, J. F.; Brog, K. C., "Fabrication of barium fluoride infrared windows," Battelle Mem. Inst., Columbus, Ohio, USA, U. S. N. T. I. S., AD–786–679, pp. 1–69. Sep. 1974.

*Primary Examiner*—Donald E. Czaja
*Assistant Examiner*—Sean Vincent
*Attorney, Agent, or Firm*—Wenderoth, Lind & Ponack

[57] ABSTRACT

The present invention provides a method of producing an infrared ray transmitting material, a large-sized one which can be manufactured at a low price, consisting of a polycrystal not liable to cleavage, which makes only a slight absorption of infrared rays all over the region of 8–11 μm wave lengths, thus being highly transmissive. The material is a polycrystalline barium fluoride sintered body excellent in transmission to infrared region of 8–11 μm wave lengths, one that is most excellent in the infrared transmission and being produced by a method of hot press sintering and an HIP treatment in combination, one that gives somewhat inferior transmission but which is low-priced produced by a method of CIP molding and normal pressure sintering in combination, and one that is regarded as an intermediate between the aforementioned two by a method comprising the CIP molding, normal-pressure sintering and the HIP treatment in combination, in all cases entirely without the addition of any binder or sintering aid.

11 Claims, 3 Drawing Sheets

AVERAGE GRAIN SIZE
OF SINTERED BODY
80 μm

AVERAGE GRAIN SIZE
OF SINTERED BODY
100 μm

METHOD OF PRODUCING AN INFRARED TRANSMITTING BARIUM FLUORIDE SINTERED BODY

This application is a divisional application of U.S. application Ser. No. 08/389,420, filed Feb. 16, 1995 now U.S. Pat. No. 5,502,015, which in turn is a continuation-in-part of abandoned application Ser. No. 08/084,616, filed Jul. 1, 1993.

BACKGROUND OF THE INVENTION

1. Field of the Invention

The present invention relates to a polycrystalline infrared transmitting barium fluoride sintered body excellent in transmission to infrared rays, which is suitable for use as an infrared ray transmitting (optical) material or as infrared optical components etc. used in infrared equipment.

2. Description of the Prior Art

In recent years, various types of infrared equipment which detect infrared rays from heat radiated or scattered from a body have developed. For example, infrared sensors for accurately checking the position of an object as anticrime detectors, night vision devices capable of observing an object in the dark and thermometers for measuring the temperature of an object and its temperature distribution and the like instruments have been developed and they are beginning to enjoy great popularity.

Infrared optical components, such as window materials, lenses, prisms etc. which are used in these infrared equipment are required to be made of materials which will transmit infrared rays in the required wave length band. Materials hitherto generally used as such infrared ray transmitting materials are such single crystalline materials as germanium (Ge), silicon (Si), potassium chloride (KCl), calcium fluoride ($CaF_2$) and barium fluoride ($BaF_2$). These single crystalline materials were high-priced, because a long time was required for their manufacture and large-sized products were manufactured only with difficulty. Because of their liability to cleavage, they could hardly be said to have adequate mechanical strengths.

On the other hand, recently the development of infrared transmitting materials by use of the CVD (chemical vapor deposition) process has been advanced, with a result that polycrystalline materials e.g. zinc selenide, zinc sulfide etc. have been made available. Because the rate of growth of these polycrystalline materials by the CVD process is slow, their price rise is unavoidable and most of their uses have been as high priced parts, for example, as optical components of carbon dioxide lasers.

These polycrystalline materials, having high refractive indices and manifesting large loss by surface reflection, give not very high in-line transmissions, approx. 70% for ZnSe in the form of its 3 mm thick test piece and approx. 73% for ZnS, for example, being the maxima. Accordingly, it is a general practice to apply some antireflection coating on them, when they are used as optical components like optical windows etc., only to serve as a factor of cost increase.

Further, as described in U.S. Pat. No. 3,431,326, methods for producing polycrystalline infrared transmitting materials such as magnesium fluoride ($MgF_2$) or barium fluoride ($BaF_2$) or the like by the simple hot press process have been proposed. With such polycrystalline materials obtained by the process above mentioned, large absorption peaks are recognized in the practically useful region of 8–11 μm wave lengths, as shown in FIG. 4. and FIG. 5. Such absorption peaks are deleterious, for they lower the sensitivity of infrared equipment.

SUMMARY OF THE INVENTION

In view of the situation hitherto experienced with prior art, the present invention has as its object providing an infrared transmitting barium fluoride sintered body without an additive component and which has a crystal grain size of not more than 100 μm and a bending strength according to JIS R-1601 of not less than 30 MPa and a method of manufacturing this material. This barium fluoride sintered body is a polycrystalline infrared ray transmitting material which is not liable to cleavage and manufactured in large sizes and at low prices. This material has excellent transmission to infrared rays, manifests only small absorption all over the particularly commercially useful infrared region of 8–11 μm wave lengths.

With a view to attain the above-mentioned object, this invention makes it possible to obtain a polycrystalline barium fluoride sintered body excellent in transmission in the infrared region of 8–11 μm wave lengths by combining hot press sintering or normal pressure (in atmospheric pressure) sintering with HIP (Hot Isostatic pressing) treatment or CIP (Cold Isostatic Pressing) molding entirely without addition of any binder and sintering aid which are used in the conventional die molding and sintering process in producing such an infrared transmitting barium fluoride sintered body.

Thus a first production method of this invention is characterized in that a barium fluoride powder having a not lower than 98.5% purity and a not larger than 6 μm mean particle diameter is compacted to a theoretical density ratio of 95% or higher by hot press sintering in vacuo at a temperature of 500°–800° C. and with a pressure of 100–500 kg/cm² applied and is then subjected to an HIP treatment at a temperature of 600°–1250° C. and under a pressure not lower than 400 kg/cm². The polycrystalline barium fluoride sintered body produced by this first method in the form of its 3 mm thick test piece gives in-line transmissions of 70–93% in the infrared region of 8–11 μm wave lengths.

A second method of this invention is characterized in that a barium fluoride powder having a purity not lower than 98.5% and a size not larger than 3 μm mean particle diameter is compacted to a theoretical density ratio of 95% or higher by normal pressure sintering for 1 hr. or longer in vacuo at a temperature of 600°–900° C. or in the atmospheric air or in an inert gas at a temperature of 600°–1050° C., after its pressure molding, and is then subjected to an HIP treatment at a temperature of 700°–1000° C. and under a pressure not lower than 400 kg/cm². The polycrystalline barium fluoride sintered body produced by this second method in the form of its 3 mm thick test piece gives in-line transmissions of 60–90% in an infrared ray region of 8–11 μm wave lengths.

A third production method of this invention is characterized in that a barium fluoride powder having a not lower than 98.5% purity and a mean particle diameter of 0.5–1.5 μm is normal-pressure sintered at a temperature of 700°–850° C. for 1 hr. or longer in vacuo or in the atmospheric air or in an inert gas after its pressure molding. The polycrystalline barium fluoride sintered body produced by this third method in the form of its 3 mm thick test piece gives in-line transmissions of 55–85% to the infrared region of 8–11 μm wave lengths.

It should be noted that while generally in sintering ceramics, a binder for molding the material powder and a sintering aid for promoting the sinterability are added to the material powder, the method of this invention does not require the addition of such a binder and a sintering aid at all, thus precluding the problem of the infrared transmission of the barium fluoride sintered body being lowered by the deposition of the binder and the sintering aid as a second phase. Further, the barium fluoride sintered body thus obtained has excellent infrared transmission, giving no large absorption peaks in the commercially useful region of 8–11 μm wave lengths, and furthermore has excellent mechanical strengths.

First, the first production method of this invention is described: According to this first production method, a barium fluoride sintered body, being a high purity and high density polycrystal and having the highest infrared transmission, is obtained through a combination of the hot press sintering of the first step and the HIP treatment of the second step, entirely without the addition of any binder or sintering aid.

The BaF$_2$ powder used as the material should have a purity not less than 98.5% for prevention of lowered transmission due to absorption by impurities. Particularly, the inclusion of transition metal elements such as Fe is undesirable. Such elements as oxygen, hydrogen, nitrogen etc. which give infrared absorption as they react with barium element, if contained in large amounts, are also undesirable. On the other hand, regarding the particle diameter of the BaF$_2$ powder, its densification is not well advanced at the time of its sintering, if it is coarsely agglomerated. Some pores will be left, causing reduced transmission. But when it is hot-press sintered, even from relatively coarse grains, a dense sintered body, which is subjectable to the subsequent HIP treatment, is obtained. Its mean particle diameter should only be not larger than 6 μm.

In the hot press sintering at the first step of the first production method, the theoretical density ratio of the sintered body obtained needs to be 95% or higher. If its theoretical density ratio is lower than 95%, most of the remaining pores will become the so-called open pore. Then the high pressure gas will penetrate into the interior through these open pores, resulting in inadequate advancement of density increase by the HIP treatment.

The temperature of the aforementioned hot press sintering is set at 500°–800° C. Below 500° C., it is difficult to obtain a sintered body with a high density of not lower than 95% in its theoretical density ratio. However, over 800° C. and particularly in vacuo, evaporation of BaF$_2$ is vigorous, not only contaminating the furnace body, but resulting in lowered yield. Moreover, its vigorous grain growth makes its grain coarse, thus decreasing the mechanical strengths of the sintered body obtained. The reason why the pressure of the hot press is set at 100–500 kg/cm$^2$ is that below 100 kg/cm$^2$, a high density sintered body having a theoretical density ratio not lower than 95% can not be obtained and that above about a 500 kg/cm$^2$ pressure, it is hard to use the graphite mold for usual hot pressing from the strength standpoint.

The aforementioned hot press sintering should preferably be performed in vacuo. When the hot press sintering is performed in the atmospheric air, air tends to be left in the pores in the sintered body and the pores containing air are difficult to remove by the subsequent processes like HIP treatment. As a result, if residual pores which could not be removed exist in the sintered body, even if in a very small amount, they greatly scatter the incident light, giving rise to a large decrease in its transmission.

In the second step of the HIP treatment in the first production method, a pressure not lower than 400 kg/cm$^2$ is isostatically applied on the sintered body by a high pressure gas at a temperature of 600°–1250° C., whereby removal of pores is accelerated and uniformly advanced by a plastic deformation and a diffusion mechanism. As a result, residual pores are eliminated as a whole, achieving a higher density of 99% or higher in its theoretical density ratio, thus making it possible to have spatially uniform and high infrared transmission throughout the sintered body.

The reason why the temperature of the aforementioned HIP treatment should be set at 600°–1250° C. is that under 600° C., satisfactory transmission can not be obtained because of inadequate action of pore removal and that over 1250° C., grain growth is vigorous, yielding coarse grain size and leading to greatly decreased mechanical strength of the sintered body. It should be noted that in order to obtain fine-grained high strength sintered body by inhibiting the crystal grain growth, preferably an HIP treatment performed at 600°–900° C. should be used. If the pressure applied is below 400 kg/cm$^2$, removal of pores will be inadequate, resulting in failure to have satisfactory transmission. The high pressure gas used in the HIP treatment should desirably be argon (Ar) or the like inert gas or nitrogen gas, or their mixed gases. This applies also in the case of the HIP treatment in the second production method described hereinbelow.

Next, the second production method of this invention is described: By this second production method, a high purity and high density polycrystalline barium fluoride sintered body which has infrared transmission not inferior to that obtained by the first production method, this method being simple and more economical than the first method notwithstanding, is obtained through a combination of pressure molding of a first step, normal pressure sintering of a second step and HIP treatment of a third step, entirely without addition of any sintering aid or binder.

The BaF$_2$ powder used as the material should have a purity not lower than 98.5% similarly as in the first production method and should be finer-grained than in the case of the first method, having a mean particle diameter not larger than 3 μm. Using a BaF$_2$ powder having a purity and a mean particle diameter in the range as above-specified, it is possible, even though by normal pressure sintering, to obtain a sintered body which is adequately compact or which has a theoretical density ratio not lower than 95%, similarly as attained by the first production method.

Prior to the normal pressure sintering, molding of the material powder is of course necessary. According to the second production method of this invention, a pressure molding at a high pressure or preferably a CIP molding under a pressure not lower than 1.5 ton/cm$^2$ is performed as a first step, thereby making the theoretical density ratio of the mold not lower than 60%. If the molding pressure is lower than this, the mold will have a low density and have pores left, even after undergoing the subsequent normal pressure sintering, these pores serving as a light scattering factor, thus detracting from attainment of high in-line transmissions intended to have. Thus it is only at a molding pressure not lower than 1.5 ton/cm$^2$ that the secondary grains formed of a fine BaF$_2$ powder which has been agglomerated are broken up, thereby bringing the mold density to nearly 60% or above in its theoretical density ratio.

The addition of the binder in the general powder molding process, while raising the mold density and the mold strength, will invite lowered in-line transmissions of the sintered body because of about 0.5% impurities remaining as ash content after the debindering process. If the debindering temperature is raised to reduce this ash content, the sintering will begin, causing the binder contrarily to be taken into the sintered body without being removed. Such residues mostly contain carbon, oxygen, hydrogen, nitrogen, etc., which undesirably react with barium element, effecting unnecessary infrared absorption.

In the second production method, the mold which has been molded as hereinabove-described is normal-pressure (atmospheric pressure) sintered at the next second step. The ambient atmosphere in which to perform the normal pressure sintering may be either in vacuo or in the atmospheric air or nitrogen gas or any inert gas such as argon gas and so on. Generally in the normal pressure sintering in the atmospheric air or in an inert gas, the molecules of air or gas are said to be readily taken into the pores in the sintered body, but an experimental result has suggested that air or gas molecules are barely taken in, for assurance of commercially adequate transmission.

The sintering temperature for this normal pressure sintering should be 600°–900° C., preferably 700°–800° C., when the sintering is performed in vacuo, but 600°–1050° C., preferably 700°–800° C., when it is performed in the atmospheric air or in an inert gas. If the sintering temperature is below 600° C., it is difficult to obtain a sintered body having such a high density as 95% or higher in its theoretical density ratio. If it exceeds 900° C. in sintering in vacuo, the evaporation of $BaF_2$ will become vigorous, making it impossible to hold the mold's form. On the other hand, if the temperature is over 1050° C. when sintering it in the atmospheric air or in an inert gas, the crystal grain growth will become notable, yielding coarse crystal, thus leaving unremoved residual pores which are unremovable even by the following processes. This results in failure to attain the anticipated high in-line transmissions.

The temperature raising rate should preferably be adjusted to 1°–5° C./min from around 500° C. at which the sintering begins. The sintering time in the normal pressure sintering requires one hour or longer at the aforementioned sintering temperatures, but since improvement in its density and its in-line transmissions can no longer be expectable, even if the time exceeds 5 hr., the range of 1–5 hr. should be preferred.

In the HIP treatment of the third step in the second production method, a pressure of 400 kg/cm² or higher is isostatically applied on the sintered body by a high pressure gas at a temperature of 700°–1000° C. By this HIP treatment, compacting to 99% or higher in its theoretical density ratio is achieved similarly as in the case of the first method, thereby assuring spatially uniform and high transmission throughout the sintered body. The reasons why the temperature for the aforementioned HIP treatment is selected to be 700°–1000° C., and the pressure to be not lower than 400 kg/cm², are because of the similar reasons as in the case of the HIP treatment in the aforementioned first production method. It should be noted further that in order to obtain a sintered body which is fine-grained and has high strengths by suppressing its crystal grain growth, an HIP treatment performed at 700°–900° C. should be preferred.

Finally, the third production method of this invention is described: According to this third production method, a barium fluoride sintered body, being a high purity and high density polycrystal, which manifests infrared transmission at the lower limit of the commercially useful region, but which is obtained at the lowest price by the simplest method comprising a combination of pressure molding of a first step and normal pressure sintering of a second step, entirely without addition of any sintering aid or binder.

The purity of the $BaF_2$ powder used as the material should be not lower than 98.5% similarly as in the cases of the first and the second production methods, and its mean particle diameter should fall in the range of 0.5–1.5 μm, the powder being still finer-grained than in the cases of the first and the second production methods. Using a $BaF_2$ powder with a purity and a mean particle diameter falling in such ranges, it is possible to obtain a sintered body which is adequately dense, having a 95% or higher theoretical density ratio, even merely by normal temperature sintering, without addition of any sintering aid, similarly as in the first and the second production methods.

The pressure molding of the first step and the normal pressure sintering of the second step in the third production method are similar as in the case of the second production method, but only the sintering temperature should fall in the range of 700°–850° C. In the third production method which does not employ the HIP treatment later, it is difficult to obtain a sintered body finally having a high density of not lower than 99% in its theoretical density ratio at a sintering temperature lower than 600° C.; on the other hand, the sintering temperature should not be allowed to be above 850° C. at a maximum in order to attain the expected in-line transmissions by avoiding coarse grain growth of its crystal, thereby eliminating residual pores otherwise left in its crystal grains.

Particularly in the second and the third production methods which involve the normal pressure sintering, degassing should preferably be performed at around 400°–500° C. before the mold reaches the sintering temperature, because $BaF_2$ used as the material, itself being slightly soluble in water, tends to absorb moisture. This degassing process should preferably be performed in vacuo. Accordingly, as the preferable process of the normal pressure sintering in the third production method, the degassing is performed at around 400°–500° C., while heating the mold to higher temperatures in vacuo; then, after introducing the atmospheric air and an inert gas, the mold is heated to the sintering temperature, thereby not only making grain growth by sintering, but completely removing the pores.

By the respective methods of this invention described hereinabove, it is possible to obtain an infrared transmitting barium sintered body having such a high purity as 98.5% or higher, not containing any binder nor sintering aid at all, being densified to a not lower than 99% theoretical density ratio and giving excellent in-line transmissions all over the infrared region of 8–11 μm wave lengths. Particularly, by the first production method, an infrared transmitting barium fluoride sintered body having very high in-line transmissions incomparable to those conventionally available is obtained. The third production method makes it possible to produce at the lowest price an infrared transmitting barium fluoride sintered body having in-line transmissions which are somewhat inferior but which are sufficiently high for commercial use.

By the second production method, it is possible to obtain at a moderate price an infrared transmitting barium fluoride sintered body which is intermediate between those obtained by the first and the third production methods or an infrared transmitting barium fluoride sintered body which has high in-line transmissions and which is highly commercially useful. By respective methods of this invention, an infrared transmission which is spatially uniform may be achieved even with large-sized products. Further any shapes including flat plate, lens, dome or the like shapes may be adaptable. Particularly, the second and the third production methods which employ the normal pressure sintering permit complex shapes to be readily produced, for the great benefit of enhanced design freedom.

DETAILED DESCRIPTION OF THE PREFERRED EMBODIMENTS

Example 1

A $BaF_2$ powder having a 99% purity and a 1.5 μm mean particle diameter was hot-press sintered for 2 hr., using a graphite mold with an 80 mm ID in a $5\times10^{-2}$ torrs vacuum at a temperature of 600° C. and under a pressure of 300 kg/cm$^2$. The sintered body had a density of 4.65 g/cm$^2$, having been compacted to 96% theoretical density ratio. Next this sintered body was put in an HIP apparatus, to be subjected to an HIP treatment for 2 hr., using Ar gas at a temperature of 1100° C. and under a pressure of 2000 kg/cm$^2$.

Figure 1:
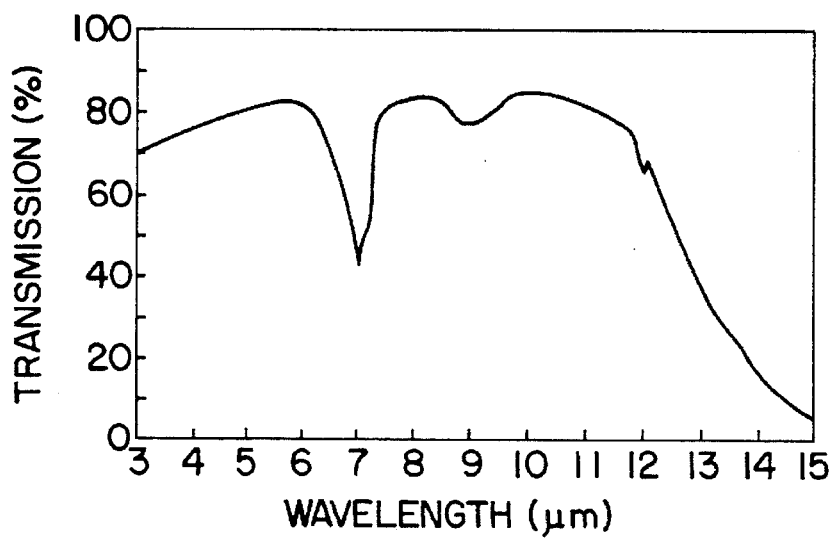
FIG. 1 is a graph giving infrared spectral transmissions of a barium fluoride sintered body, in the form of a 3 mm thick polished test piece, produced by the first production method of this invention in Example 1.
Figure 6A:
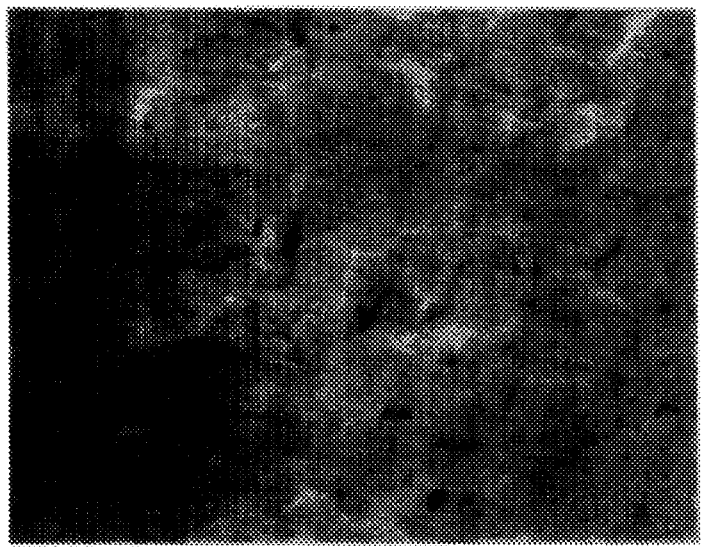
FIGS. 6A and 6B are photographs showing the crystalline microstructure of $BaF_2$ for Example 1 and Example 3 (Sample 1), respectively.

The polycrystalline $BaF_2$ sintered body with an 80 mm diameter thus obtained, when mirror-polished to a 3 mm thickness, gave a somewhat whitish appearance. Next as the transmission of this $BaF_2$ sintered body was measured, using a spectrophotometer, the 3 mm thick test piece gave in-line transmissions, as shown in FIG. 1, of 70% or higher all Over the infrared region of 8–11 μm wave lengths, although some absorption was observed at around a 9 μm wave length, the in-line transmissions to respective infrared rays of 8, 10 and 11 μm wave lengths being found to be 84, 86 and 84%, the aforementioned in-line transmissions nearly invariable throughout the 80 mm dia. test piece. Further, the average crystalline grain size of the sintered body, when examined with a microscope, was 80 μm (FIG. 6A) and uniform without any extraordinary growth grains. Additionally, the sintered body was subjected to the four point bending test according to JIS R-1601. According to this test, the average value of 10 test pieces was 31.4 MPa.

As a control, a $BaF_2$ sintered body was produced similarly as in the aforementioned Example 1, except that the hot press sintering was performed in the atmospheric air. The in-line transmissions of a 23 mm thick test piece of this $BaF_2$ sintered body were found to be 5, 12 and 23% respectively to 8, 10 and 11 μm wave lengths. With regard to another $BaF_2$ sintered body produced similarly as in the above-mentioned Example 1, except that a $BaF_2$ powder having a 99% purity and a 6.5 μm mean particle diameter was used, its 3 mm test piece gave only 8, 21 and 29% in-line transmissions respectively to 8, 10 and 11 μm wave lengths, the aforementioned measured in-line transmissions widely varying throughout the test piece.

Example 2

A $BaF_2$ powder having a 99% purity and a 5.0 μm mean particle diameter was hot-press sintered for 2 hr., using a graphite mold with an 80 mm ID, in a $5\times10^{-2}$ torrs vacuum, at a temperature of 700° C. and under a pressure of 250 kg/cm$^2$. The $BaF_2$ sintered body thus obtained had a density of 4.71 g/cm$^2$, having been densified to 97.5% in its theoretical density ratio. Next, this sintered body was put in an HIP apparatus, to be subjected to an HIP treatment for 2 hr. using Ar gas at a temperature of 1000° C. and under a pressure of 1800 kg/cm$^2$.

The 80 mm dia. polycrystalline $BaF_2$ sintered body thus obtained, when mirror-polished to a 3 mm thickness, gave a somewhat whitish appearance. Next, the transmissions of this $BaF_2$ sintered body in the form of a 3 mm thick test piece, when measured using a spectrophotometer, were found to be not lower than 70% all over the infrared region of 8–11 μm wave lengths. Its in-line transmissions to infrared rays of 8, 10 and 11 μm wave lengths were found to be 77, 73 and 70% respectively and the measured in-line transmissions gave almost no variances throughout the 80 mm dia. test piece. Further, the average crystalline grain size of the sintered body, when examined with a microscope, was 95 μm and uniform without any extraordinary growth grains. Additionally, when the sintered body was subjected to the four point bending test according to JIS R-1601, the average value of 10 test pieces was 33.2 MPa.

For comparison, a $BaF_2$ sintered body was produced similarly as in the above-described Example 2, except that the conditions of the HIP treatment were set at 550° C. and under 300 kg/cm$^2$. Regarding the $BaF_2$ sintered body sample thus obtained, the in-line transmissions as measured of its 3 mm thick test piece to infrared rays of 8, 10 and 11 μm wave lengths respectively were found to be 60, 68 and 55%.

Example 3

A mold with a 50 mm diameter and 5 mm thickness was obtained by the CIP molding process under a pressure of 2 ton/cm$^2$, with a $BaF_2$ powder having a 99% purity and a 1.3 μm mean particle diameter put in a rubber mold. This mold had a density of 62% in its theoretical density ratio. Then this mold was normal-pressure sintered for 3 hr. in nitrogen gas at a temperature of 800° C. The $BaF_2$ sintered body had a 4.81 g/cm$^3$ density, having been compacted to a 98% theoretical density ratio. Thereafter, this sintered body was put in an HIP apparatus, to be subjected to an HIP treatment for 2 hr. using Ar gas at a temperature of 800° C. and under a pressure of 1500 kg/cm$^2$.

Figure 2:
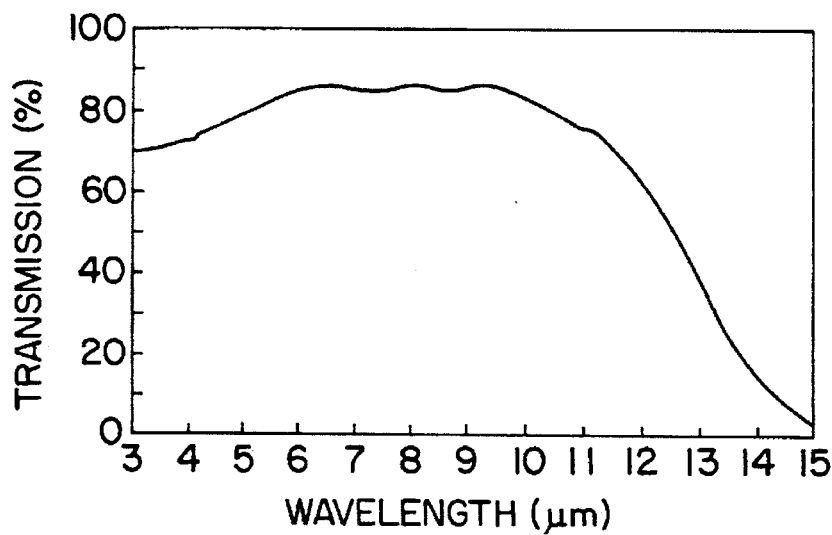
FIG. 2 is a graph giving infrared spectral transmissions of a barium fluoride sintered body, in the form of a 3 mm thick polished test piece, produced by the second production method of this invention in Example 3 (Sample 1)

The 50 mm dia. polycrystalline $BaF_2$ sintered body, when mirror-polished to a 3 mm thickness, gave a somewhat whitish appearance. The in-line transmissions of this 3 mm thick test piece, as measured using an infrared spectrophotometer, was 60% or higher all over the infrared region of 8–11 μm wave lengths, as shown in FIG. 2. Its in-line transmissions to 8, 10 and 11 μm were found to be 87, 85 and 76%, respectively, and these in-line transmissions were nearly uniform throughout the 50 mm dia. test piece.

Figure 6B:
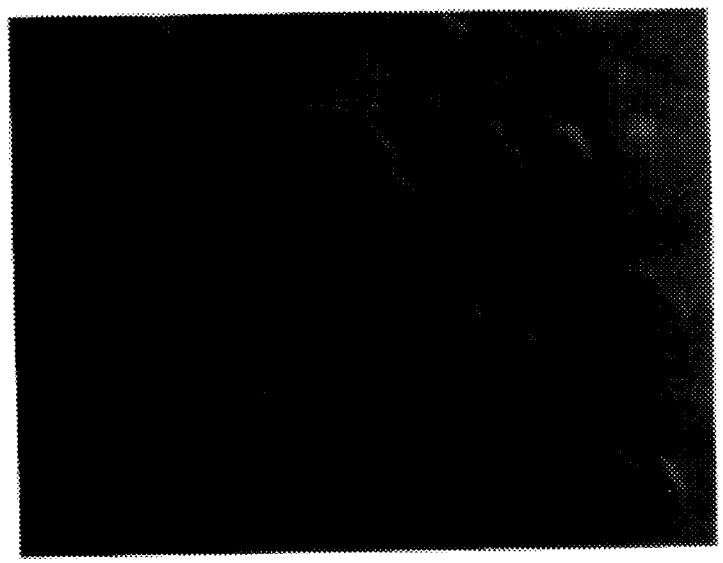

Further, the average crystalline grain size of the sintered body, when examined with a microscope, was 100 μm (FIG. 6B) and uniform without any extraordinary growth grains. Additionally, when the sintered body was subjected to the four point bending test according to JIS R-1601, the average value of 10 test pieces was 30.4 MPa.

Example 4

Various BaF$_2$ sintered bodies were produced by the similar method as that of Example 3 using the same BaF$_2$ powder as used in Example 3, except that the temperature and the ambient atmosphere for the normal pressure sintering were varied as shown in Table 1. With regard to samples 2–11 of this example, their in-line transmissions the average grain size and bend strength were measured similarly as in Example 3. The results were put up in Table 1. The data from the sintered body obtained in the above-described Example 1 were jointly listed as Sample 1 in Table 1.

Figure 3:
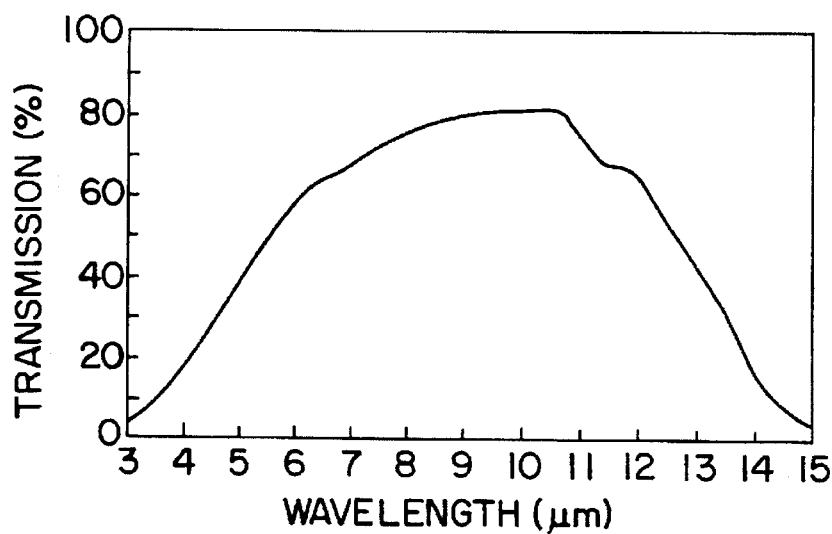
FIG. 3 is a graph giving infrared spectral transmissions of a barium fluoride sintered body, in the form of a 3 mm thick polished test piece, produced by the third production method of this invention in Example 5 (Sample 15)
Figure 4:
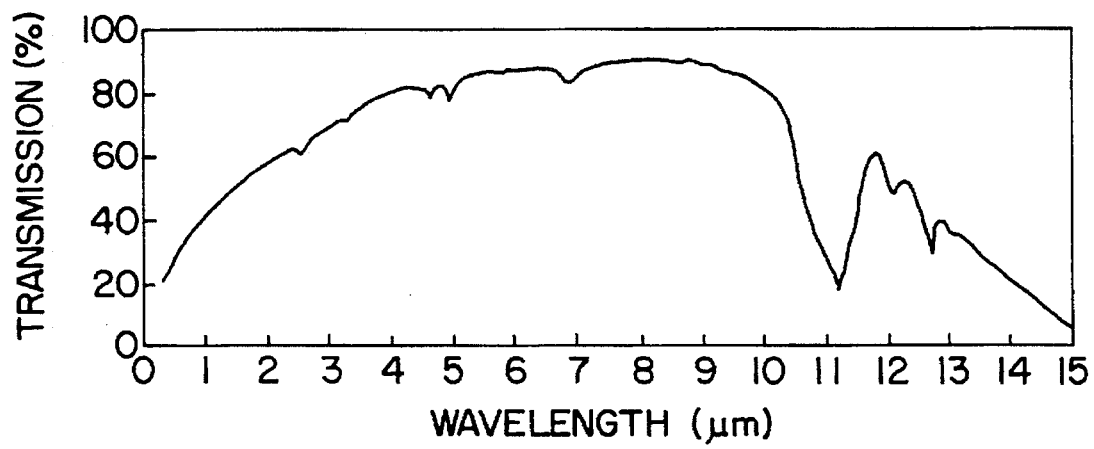
FIG. 4 is a graph giving infrared spectral transmissions of a barium fluoride sintered body, in the form of a 2.9 mm thick test piece, obtained by the conventional method comprising the hot press sintering only.
Figure 5:
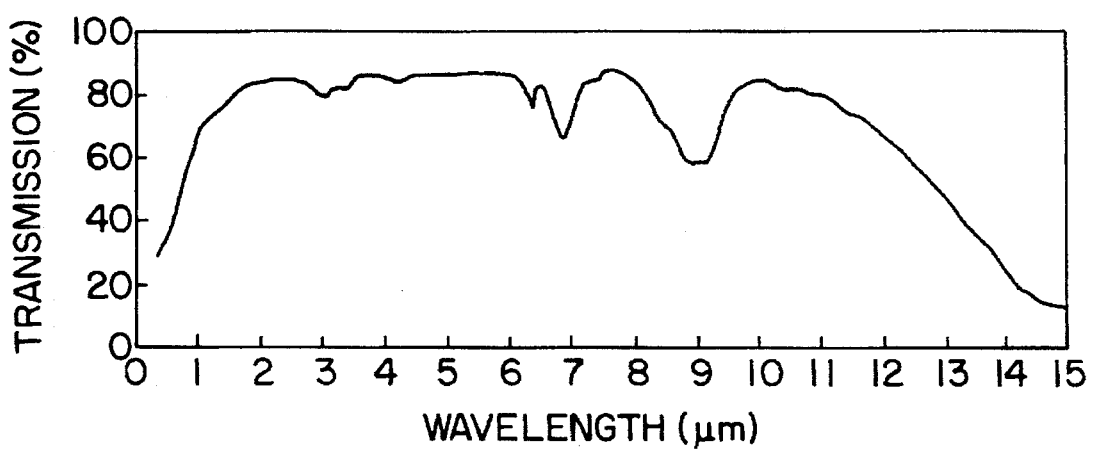
FIG. 5 is a graph giving infrared spectral transmissions of another barium fluoride sintered body, in the form of a 2.7 mm thick test piece, obtained by the conventional method comprising the hot press sintering only.

Further, produced as comparative examples were Sample 12 obtained using a BaF$_2$ powder with a 4 μm mean particle diameter, Sample 13 obtained with the time of the normal pressure sintering set at 50 min and Sample 14 obtained with the pressure of the HIP treatment set at 400 kg/cm$^2$. Provided that the conditions except for the above-mentioned for these Samples were identical to those in Example 4. With regard to these comparative examples, their in-line transmissions were similarly measured. The results are jointly put up in Table 1:

tered body in the form of a 3 mm test piece, as measured using an infrared spectrophotometer, were not lower than 60% all over the infrared region of 8–11 μm wave lengths, as shown in FIG. 3, its in-line transmissions to 8, 10 and 11 μm being 76, 82 and 76%, respectively, the aforementioned in-line transmissions nearly uniform throughout the 50 mm dia. test piece. Further, the average crystalline grain size of the sintered body, when examined with a microscope, was 40 μm and uniform without any extraordinary growth grains. When the sintered body was subjected to the four point bending test according to JIS R-1601, the average value of 10 test pieces was 38.2 MPa.

Further various BaF$_2$ sintered bodies were produced by the similar method as of Example 5, except that the mean particle diameter, the pressure of the CIP and the temperature and the ambient atmosphere for the normal pressure sintering were varied as shown an Table 2 below. For the Samples 16–26 of this example, measurements were similarly taken of their in-line transmissions, using a spectrophotometer, as well as their average grain size and bending strength and the results were placed in Table 2 jointly with the results obtained with the aforementioned Sample 15.

The same BaF$_2$ powder as Sample 15 with 5% of a wax base binder added was subjected to a normal metallic mold press molding under a pressure of 1 ton/cm$^2$, yielding a mold with a 50 mm diameter and a 5 mm thickness. Then this mold was normal-pressure sintered under the same conditions as with Sample 15 and the sintered body thus obtained

TABLE 1

| Sample No. | Conditions of normal pressure sintering | | In - line transmission (%) to each wave length | | | Average grain size of sintered body | Four point bending strength (MPa) |
|---|---|---|---|---|---|---|---|
| | Temp. (° C.) | Atmosphere | 8 μm | 10 μm | 11 μm | | |
| 1 | 700 | Nitrogen | 87 | 85 | 76 | 100 | 30.4 |
| 2 | 800 | Nitrogen | 88 | 85 | 75 | 75 | 35.2 |
| 3 | 900 | Nitrogen | 80 | 79 | 76 | 95 | 33.7 |
| 4 | 1000 | Nitrogen | 65 | 70 | 72 | 100 | 31.1 |
| 5 | 700 | Atmospheric air | 75 | 80 | 70 | 70 | 36.1 |
| 6 | 800 | Atmospheric air | 85 | 85 | 73 | 80 | 34.4 |
| 7 | 900 | Atmospheric air | 75 | 78 | 71 | 85 | 32.9 |
| 8 | 1000 | Atmospheric air | 64 | 70 | 62 | 100 | 30.1 |
| 9 | 700 | Vacuum | 87 | 83 | 75 | 60 | 36.1 |
| 10 | 800 | Vacuum | 87 | 78 | 73 | 75 | 34.9 |
| 11 | 900 | Vacuum | 70 | 65 | 70 | 90 | 30.9 |
| 12 | 700 | Nitrogen | 41 | 65 | 50 | 80 | 34.1 |
| 13* | 700 | Nitrogen | 55 | 70 | 53 | 50 | 38.4 |
| 14* | 700 | Nitrogen | 55 | 75 | 68 | 80 | 33.7 |

(Note)
The samples identified by * in this table are Comparative Examples.

Example 5

A BaF$_2$ powder having a 99% purity and a 1.3 μm mean particle diameter was put in a rubber mold and subjected to a CIP molding process under a pressure of 3 ton/cm$^2$, yielding a mold with a 50 mm diameter and a 5 mm thickness. The density of this mold was found to be 62% in its theoretical density ratio. Next this mold was normal-pressure sintered for 2 hr. in nitrogen gas at a temperature of 700° C. The BaF$_2$ sintered body thus obtained gave a somewhat whitish appearance and had a 4.86 g/cm$^3$ density, having been compacted to a theoretical density ratio of 99%.

This polycrystalline BaF$_2$ sintered body (Sample 15), when mirror-polished to a 3 mm thickness, gave a somewhat whitish appearance. The in-line transmissions of this sinwas mirror-polished. The in-line transmissions of this Sample 30 were measured using a spectrophotometer. The results are put up jointly with other data in Table 2:

TABLE 2

| Sample No. | Mean Particle diameter (μm) | Molding pressure (ton/cm²) | Conditions for normal-pressure sintering | | In-line transmission to each wave length (%) | | | Average grain size of sintered body (μm) | Four point bending strength (MPa) |
|---|---|---|---|---|---|---|---|---|---|
| | | | Temperature (°C.) | Atmosphere | 8 μm | 10 μm | 11 μm | | |
| 15 | 1.3 | 3.0 | 700 | Nitrogen | 76 | 82 | 76 | 40 | 38.2 |
| 16 | 1.3 | 3.0 | 750 | Nitrogen | 72 | 80 | 76 | 45 | 37.1 |
| 17 | 1.3 | 3.0 | 800 | Nitrogen | 74 | 75 | 75 | 50 | 36.0 |
| 18 | 1.3 | 3.0 | 850 | Nitrogen | 66 | 70 | 65 | 60 | 33.0 |
| 19 | 1.3 | 3.0 | 700 | Atmospheric air | 64 | 70 | 65 | 45 | 36.9 |
| 20 | 1.3 | 3.0 | 750 | Atmospheric air | 72 | 78 | 70 | 45 | 36.0 |
| 21 | 1.3 | 3.0 | 800 | Atmospheric air | 68 | 75 | 68 | 55 | 37.2 |
| 22 | 1.3 | 3.0 | 850 | Atmospheric air | 63 | 70 | 65 | 55 | 34.0 |
| 23 | 1.3 | 3.0 | 700 | Vacuum | 73 | 82 | 76 | 30 | 46.0 |
| 24 | 1.3 | 3.0 | 750 | Vacuum | 72 | 80 | 73 | 35 | 43.2 |
| 25 | 1.3 | 3.0 | 800 | Vacuum | 68 | 70 | 68 | 45 | 41.0 |
| 26 | 1.3 | 3.0 | 850 | Vacuum | 65 | 68 | 63 | 50 | 37.2 |
| 27* | 1.3 | 3.0 | 650 | Nitrogen | 35 | 40 | 38 | 20 | 50.0 |
| 28* | 1.3 | 3.0 | 900 | Nitrogen | 50 | 65 | 65 | 65 | 34.6 |
| 29* | 2.0 | 3.0 | 700 | Nitrogen | 48 | 51 | 46 | 40 | 40.1 |
| 30* | 1.3 | 1.0 | 700 | Nitrogen | 38 | 55 | 44 | 40 | 37.4 |

(Note)
The samples identified by * are Comparative Examples.

Example 6

A BaF$_2$ powder having a 99% purity and a 1.3 μm mean particle diameter was subjected to a CIP molding under a pressure of 3 ton/cm², similarly as in Example 5, yielding a 50 mm dia. and 5 mm thick mold. Next this mold was heated to higher temperatures in vacuo and degassed at about 400° C. Thereafter, it was further heated to still higher temperatures, while introducing nitrogen gas, and then normal-pressure sintered at a temperature of 750° C. for 2 hr. The BaF$_2$ sintered body thus obtained had a density of 4.86 g/cm³ and gave a somewhat translucent appearance.

The in-line transmissions of this BaF$_2$ sintered body mirror finished to a 3 mm thickness, as measured using a spectrophotometer, were found to be not lower than 70% all over the infrared region of 8–11 μm wave lengths, the in-line transmissions to 8, 10 and 11 μm wave lengths being 76, 80 an 76%, respectively, the aforementioned in-line transmissions nearly uniform throughout the 50 mm dia. test piece. Further, the average crystalline grain size of the sintered body, when examined with a microscope, was 50 μm and uniform without any extraordinary growth grains. Additionally, when the sintered body was subjected to the four point bending test according to JIS R-1601, the average value of 10 test pieces was 38.3 MPa.

Example 7

A BaF$_2$ powder having a 98.8% purity and a 1.0 μm mean particle diameter was put in a rubber mold, to be subjected to a CIP molding under a pressure of 1.2 ton/cm², yielding an 80 mm dia. and an 8 mm thick mold. Next, this mold was normal-pressure sintered in nitrogen gas at a temperature of 700° C. for 1 hour. This sintered body was put in an HIP apparatus, to be subjected to an HIP treatment for 1 hr., using Ar gas at a temperature of 800° C. and under a pressure of 1340 kg/cm².

The in-line transmissions of the thus obtained BaF$_2$ sintered body, then mirror-polished to a 3 mm thick test piece, were not lower than 70% all over the infrared region of 8–11 μm wave lengths, the in-line transmissions to 8, 10 and 11 wave lengths being 88, 84 and 75%, respectively.

Further, the average crystalline grain size of the sintered body, when examined with a microscope, was 60 μm and uniform without any extraordinary growth grains.

Further, this test piece was cut and surface-ground to 3×3×40 mm according to JIS R-1601 and it was then subjected to a four point bending test. The results gave measured values for 12 pieces of 37.9 MPa avg., 45.0 MPa max. and 32.0 MPa min. It turned out that by the method of this invention, an infrared transmitting barium fluoride sintered body excellent in mechanical strength is obtainable.

Example 8

A BaF$_2$ powder having a 98.6% purity and a 1.2 μm mean particle diameter was put in a semi-spherical rubber mold, to be subjected to a CIP molding under a pressure of 1.7 ton/cm², yielding an approx. 65 mm dia. and a 7 mm thick hollow semi-spherical (dome shape) mold. Next, this mold was normal-pressure sintered for 2 hr. in nitrogen gas at a temperature of 750° C. and further subjected to an HIP treatment for 1.5 hr. using Ar gas at a temperature of 800° C. and under a pressure of 1340 kg/cm².

The BaF$_2$ sintered body thus obtained was ground to a 3 mm thick semi-sphere and its in-line transmissions were measured in a direction perpendicular to its curvature. The results gave in-line transmissions being not lower than 70% all over the infrared region of 8–11 μm wave lengths, the aforementioned in-line transmissions to 8, 10 and 11 μm being 86, 84 and 74%, respectively. Further, the average crystalline grain size of the sintered body, when examined with a microscope, was 60 μm and uniform without any extraordinary growth grains. Additionally, when the sintered body was subjected to the four point bending test according to JIS R-1601, the average value of 10 test pieces was determined to be 37.0 MPa.

Where such a semi-spherical sample is concerned, the conventional method relying solely on the hot press sintering tended to create low density and low transmission parts at the ends of the sample, yielding only a product which gave wide variances in transmissions. In contrast, at every measuring point of the semi-spherical sample of the aforementioned BaF$_2$ sintered body of this invention, the variances in the in-line transmissions to arbitrary wave lengths falling in the region of 8–11 μm are within ±3%. Thus it turned out a semi-spherical infrared transmitting material which poses utterly no problem in commercial uses is obtainable by the method of this invention.

The present invention makes it possible to provide at relatively a low price infrared transmitting barium fluoride sintered body having high purity and high density, being polycrystal, not liable to cleavage and having enough mechanical strength, which gives quite excellent in-line transmissions to the infrared region of 8–11 μm wave lengths and even one that is relatively large-sized or complex-shaped.

This infrared transmitting barium fluoride sintered body is useful particularly as window materials, lenses, prisms and the like infrared optical components which are used in infrared equipment such as infrared ray sensors, night vision devices, thermometers, etc.

What is claimed is:

1. A method of producing an infrared transmitting barium fluoride sintered body, which comprises the steps of: compacting a barium fluoride powder having a purity not lower than 98.5% and a mean particle diameter not larger than 6 μm to a theoretical density ratio of 95% or higher by CIP molding to obtain a compact, sintering the compact by hot press sintering in vacuo at a temperature of 500°–800° C. and under a pressure of 100–500 kg/cm$^2$ and subjecting the sintered material to an HIP treatment at a temperature of 600°–1250° C. and under a pressure not lower than 400 kg/cm$^2$.

2. A method of producing an infrared transmitting barium fluoride sintered body, which comprises the steps of: compacting a barium fluoride powder having a purity not lower than 98.5% and a mean particle diameter not larger than 3 μm to a theoretical density ratio of 95% or higher by CIP molding to obtain a compact, sintering the compact by normal pressure sintering for 1 hour or longer at a temperature of 600°–900° C. in vacuo and subjecting the sintered material to an HIP treatment at a temperature of 700°–1000° C. and under a pressure not lower than 400 kg/cm$^2$.

3. A method of producing an infrared transmitting barium fluoride sintered body, which comprises the steps of: compacting a barium fluoride powder having a purity not lower than 98.5% and a mean particle diameter not larger than 3 μm to a theoretical density ratio of 95% or higher by CIP molding to obtain a compact, sintering the compact by normal pressure sintering for 1 hour or longer at a temperature of 600°–1050° C. in atmospheric air and subjecting the sintered material to an HIP treatment at a temperature of 700°–1000° C. and under a pressure not lower than 400 kg/cm$^2$.

4. A method of producing an infrared transmitting barium fluoride sintered body, which comprises the steps of: compacting a barium fluoride powder having a purity not lower than 98.5% and a mean particle diameter not larger than 3 μm to a theoretical density ratio of 95% or higher by CIP molding to obtain a compact, sintering the compact by normal pressure sintering for 1 hour or longer at a temperature of 600°–1050° C. in an inert gas and subjecting the sintered material to an HIP treatment at a temperature of 700°–1000° C. and under a pressure not lower than 400 kg/cm$^2$.

5. A method of producing an infrared transmitting barium fluoride sintered body, which comprises the step of: compacting a barium fluoride powder having a purity not lower than 98.5% and a mean particle diameter of 0.5–1.5 μm by CIP molding to obtain a compact, sintering the compact by normal pressure sintering for 1 hour or longer at a temperature of 700°–850° C.

6. A method according to claim 5 wherein the normal pressure sintering is carried out in vacuo.

7. A method according to claim 5 wherein the normal pressure sintering is carried out in atmospheric air.

8. A method according to claim 5 wherein the normal pressure sintering is carried out in an inert gas.

9. A method of producing an infrared transmitting barium fluoride sintered body as claimed in claims 2, 3, 4, 5, 6, 7 or 8, wherein the theoretical density ratio of the compact is brought to 95% or higher by CIP molding at a pressure not lower than 1.5 ton/cm$^2$ in the molding process prior to the aforementioned normal pressure sintering.

10. A method of producing a barium fluoride sintered body as claimed in claims 2, 3, 4, 5, 6, 7 or 8, wherein in normal pressure sintering the aforementioned compact, the compact is degassed at around 400°–500° C., before its temperature reaches the sintering temperature.

11. A method of producing an infrared transmitting barium fluoride sintered body as claimed in claim 2, 3, 4, 5, wherein in normal pressure sintering the aforementioned compact, the steps prior to a degassing of the compact, before the compact's temperature reaches the sintering temperature, are conducted in vacuo and then the normal pressure sintering process is performed in atmospheric air or in an inert gas.

* * * * *